United States Patent
Hart

(10) Patent No.: US 9,213,968 B2
(45) Date of Patent: Dec. 15, 2015

(54) SYSTEMS AND METHODS FOR CONDUCTING FINANCIAL TRANSACTIONS USING NON-STANDARD MAGSTRIPE PAYMENT CARDS

(75) Inventor: Annmarie D. Hart, Seal Beach, CA (US)

(73) Assignee: MAGTEK, INC., Seal Beach, CA (US)

(*) Notice: Subject to any disclaimer, the term of this patent is extended or adjusted under 35 U.S.C. 154(b) by 1036 days.

(21) Appl. No.: 13/324,970

(22) Filed: Dec. 13, 2011

(65) Prior Publication Data

US 2012/0150673 A1 Jun. 14, 2012

Related U.S. Application Data

(60) Provisional application No. 61/422,631, filed on Dec. 13, 2010.

(51) Int. Cl.
| | |
|---|---|
| *G06Q 20/00* | (2012.01) |
| *G06Q 40/00* | (2012.01) |
| *G06Q 20/20* | (2012.01) |
| *G06Q 20/40* | (2012.01) |
| *G06Q 20/34* | (2012.01) |
| *G06Q 20/38* | (2012.01) |
| *G07F 7/08* | (2006.01) |

(52) U.S. Cl.
CPC ............ *G06Q 20/204* (2013.01); *G06Q 20/347* (2013.01); *G06Q 20/382* (2013.01); *G06Q 20/40* (2013.01); *G07F 7/086* (2013.01)

(58) Field of Classification Search
None
See application file for complete search history.

(56) References Cited

U.S. PATENT DOCUMENTS

| | | | |
|---|---|---|---|
| 5,235,166 A | 8/1993 | Fernandez | |
| 5,430,279 A | 7/1995 | Fernandez | |
| 5,491,752 A | 2/1996 | Kaufman et al. | |
| 5,524,072 A | 6/1996 | Labaton et al. | |
| 5,616,904 A | 4/1997 | Fernandez | |
| 5,644,636 A | 7/1997 | Fernandez | |
| 5,920,628 A * | 7/1999 | Indeck et al. | 360/25 |
| 6,760,841 B1 | 7/2004 | Fernandez | |
| 6,830,182 B2 | 12/2004 | Izuyama | |

(Continued)

FOREIGN PATENT DOCUMENTS

JP 2006-294241 10/2006

OTHER PUBLICATIONS

International Search Report for Application No. PCT/US2011/064730 filed Dec. 13, 2011, dated Jun. 29, 2012, mailed Jun. 29, 2012, 3 pages.

(Continued)

*Primary Examiner* — Ariel Yu
(74) *Attorney, Agent, or Firm* — Loza & Loza, LLP; Gabriel Fitch

(57) ABSTRACT

Systems and methods for conducting financial transactions using non-standard magstripe payment cards are provided. One such system includes a magnetic stripe card storing information including a serial number on a magnetic medium of the magnetic stripe card, where the stored information does not include a Primary Account Number, a card reader configured to extract information from the magnetic medium, the extracted information including the stored serial number and a magnetic fingerprint including an intrinsic magnetic characteristic of the magnetic medium, and a computer coupled to the card reader and to a server, where the computer and the server are configured to execute a requested financial transaction using the extracted information.

24 Claims, 5 Drawing Sheets

(56) References Cited

U.S. PATENT DOCUMENTS

| | | | |
|---|---|---|---|
| 7,210,627 | B2 | 5/2007 | Morley, Jr et al. |
| 7,703,676 | B2 | 4/2010 | Hart et al. |
| 7,740,168 | B2 * | 6/2010 | Hammad ............... G06Q 20/04 235/379 |
| 2003/0192948 | A1 | 10/2003 | Izuyama |
| 2003/0212894 | A1 | 11/2003 | Buck et al. |
| 2004/0182921 | A1 | 9/2004 | Dickson et al. |
| 2005/0006471 | A1 | 1/2005 | Bedell, Jr. et al. |
| 2005/0165695 | A1 | 7/2005 | Berardi et al. |
| 2005/0167496 | A1 | 8/2005 | Morley, Jr. et al. |
| 2006/0049255 | A1 | 3/2006 | von Mueller et al. |
| 2008/0135612 | A1 * | 6/2008 | Silbernagl et al. ............ 235/382 |
| 2008/0179401 | A1 | 7/2008 | Hart et al. |
| 2008/0215887 | A1 | 9/2008 | Hart et al. |
| 2009/0254484 | A1 * | 10/2009 | Forero et al. .................... 705/68 |
| 2010/0241565 | A1 | 9/2010 | Starai et al. |

OTHER PUBLICATIONS

Written Opinion for Application No. PCT/US2011/064730 filed Dec. 13, 2011, dated Jun. 29, 2012, mailed Jun. 29, 2012, 3 pages.

* cited by examiner

| 6 digit | IIN/BIN (static) |
|---------|------------------|
| 8 digit | Protection Code (dynamic) |
| 1 digit | Check Digit (dynamic) |
| 1 digit | (RFU – static, reserved for future use) |

FIG. 5

SYSTEMS AND METHODS FOR CONDUCTING FINANCIAL TRANSACTIONS USING NON-STANDARD MAGSTRIPE PAYMENT CARDS

CROSS-REFERENCE TO RELATED APPLICATION(S)

The present application claims priority to and the benefit of Provisional Application No. 61/422,631, filed Dec. 13, 2010, entitled "SYSTEMS AND METHODS FOR CONDUCTING A FINANCIAL TRANSACTION USING A NON-PERSONALIZED PAYMENT CARD", the entire content of which is incorporated herein by reference.

FIELD

The present invention relates generally to payment card systems, and more specifically to systems and methods for conducting financial transactions using non-standard magstripe payment cards that do not store a Primary Account Number.

BACKGROUND

Conventional payment card infrastructures rely on a number of integrated elements. These infrastructure elements include personalized payment cards provided to consumers by various card issuers (e.g., Chase®, Bank of America®, and Citibank®) pursuant to rules established by card brands (e.g., VISA®, MasterCard® and American Express®). The card brands set rules for issuing cards, acceptance of cards and compliance with their rules. The card brands also set substantial fees for each payment card transaction. The infrastructure elements further include merchant point of sale systems, gateway processors, and acquirers. The merchant point of sale systems are used to process financial transactions initiated by consumers. The gateway processors can collect electronic payment data from the merchants and interact with acquirers for authorization and settlement. The acquirers can act on behalf of card issuers to authorize transactions and fund settlement monies to merchant accounts.

The Payment Card Industry Security Standards Council (PCI) sets general rules for protection of card data, and specific compliance requirements for merchants and gateway processors. The card data can include personalization information commonly displayed and/or recorded on a personalized payment card such as the card holder's name, account number (e.g., payment account data or Primary Account Number), expiration dates and card verification values (CVVs). This personalization information is both sensitive to the card holder and often targeted for theft for use in fraudulent transactions. As such, strict PCI rules require careful handling of personalization information displayed on, or stored on, payment cards.)

The PCI security requirements can be difficult and costly for merchants and gateway processors to meet. Further, the interchange/transaction fees charged by card brands can be relatively high and can therefore handicap merchants with low profit margins. In addition, true card authentication security is generally lacking from these conventional systems. As a result, risk and liability for transactions remains high and provides the basis for the high interchange/transaction fees charged by the card brands. As such, an improved system for meeting the requirements of PCI while reducing interchange/transaction fees is needed.

SUMMARY

Aspects of the invention relate to systems and methods for conducting financial transactions using non-standard magstripe payment cards that do not store a Primary Account Number. In one embodiment, the invention relates to a system for conducting a financial transaction using a non-standard payment card having a magnetic stripe, the system including a magnetic stripe card storing information including a serial number on a magnetic medium of the magnetic stripe card, where the stored information does not include a Primary Account Number, a card reader configured to extract information from the magnetic medium, the extracted information including the stored serial number and a magnetic fingerprint including an intrinsic magnetic characteristic of the magnetic medium, and a computer coupled to the card reader and to a server, where the computer and the server are configured to execute a requested financial transaction using the extracted information.

In another embodiment, the invention relates to a method for conducting a financial transaction with a non-standard payment card having a magnetic stripe, the method including storing information on a magnetic medium of a magnetic stripe card, the stored information including a serial number, where the stored information does not include a primary account number, receiving, at a computer coupled to a card reader, information indicative of a requested financial transaction, extracting information, at the card reader, from the magnetic medium, the extracted information including the stored serial number and a magnetic fingerprint including an intrinsic magnetic characteristic of the magnetic medium, and executing the requested financial transaction using the extracted information.

BRIEF DESCRIPTION OF THE DRAWINGS

FIG. 5 is a table illustrating a 16 digit token format for a dynamic authorization token that can be provided to a merchant computer in accordance with one embodiment of the present invention.

DETAILED DESCRIPTION

Figure 1:
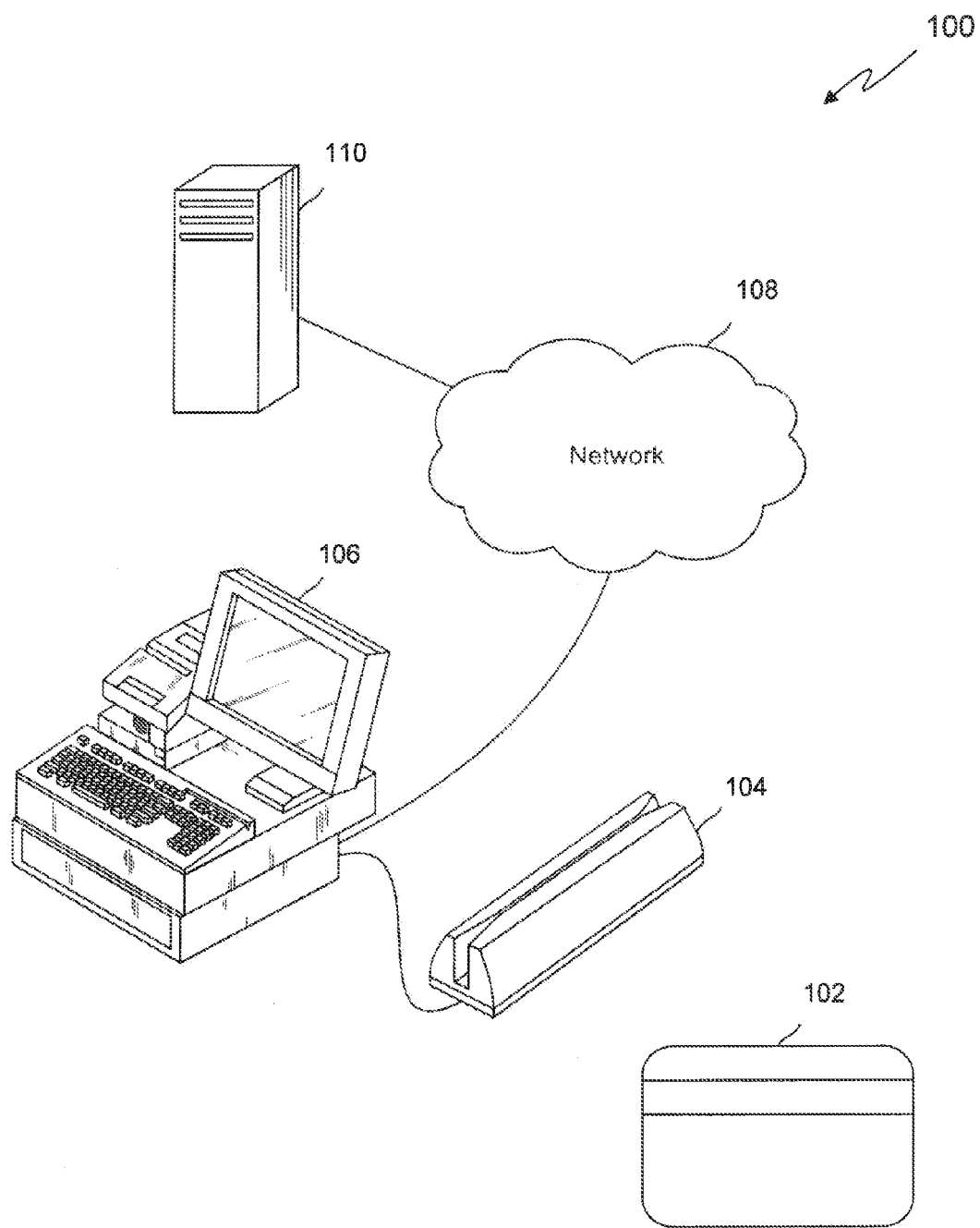
FIG. 1 is a schematic block diagram of a system for conducting a financial transaction using a non-standard magstripe payment card in accordance with one embodiment of the present invention.

Referring now to the drawings, embodiments of systems and methods for conducting financial transactions using nonstandard magstripe payment cards are illustrated. In many embodiments, the non-standard magstripe payment cards are magnetic stripe cards that unlike conventional payment cards do not store traditional personalization information such as a Primary Account Number as defined by ISO/IEC 7812 published by the International Organization for Standardization (ISO) and as well known in the payment card industry. In several embodiments, the non-standard magstripe payment cards do not store or display other traditional personalization information that can be used to identify the card holder such as the card holder's name or specialized verification codes such as the CVV. In such case, the non-standard magstripe payment cards store a unique serial number that generally cannot be extrapolated to the card holder's account number and can be safely printed on the card along with other useful information such as a brand logo, a card issuer name and/or a blank space for a personalized image. The unique serial number can be read from a non-standard magstripe payment card by a merchant during a requested financial transaction and sent to a trusted authorization server along with the transaction details to be authenticated. In addition, a magnetic fingerprint indicative of the unique intrinsic magnetic characteristics of the magnetic medium of the non-standard magnetic stripe cards can be extracted during the financial transaction and sent to the secure server for authentication of the payment card.

The server can determine the authenticity of the magstripe card based on a comparison of the extracted magnetic fingerprint and a stored magnetic fingerprint indexed by the serial number. The server can also determine whether to authorize the requested financial transaction based on the transaction details and serial number. If the magstripe card is authenticated and the requested transaction is authorized, the server can generate a dynamic authorization token for one time use and send it to the merchant. If the merchant receives the authorization token, the merchant can allow completion of the requested financial transaction and send the token back to the server for payment of settlement funds. However, if the merchant does not receive the authorization token, the merchant can prevent completion of the requested financial transaction.

In several embodiments, personally identifiable or sensitive card holder information is not stored on the non-standard magstripe payment cards and is not available to the merchant. As a result, formal compliance with PCI can be unnecessary. Further, embodiments of non-standard magstripe payment cards described herein and merchant systems for reading those cards can be thought of as complying with PCI requirements. As such, merchants can accept the non-standard magstripe payment cards without the compliance costs or risks associated with implementing systems that comply with PCI requirements. This can result in reduced transaction costs for the merchants. In addition, use of secure card authentication techniques presented herein can prevent or reduce payment card fraud. As such, use of secure card authentication can further reduce transaction costs for the merchants and provide increased security for card holders.

As used in this application, the term non-standard magstripe payment card refers to a payment card that does not store traditional card personalization data such as an card holder's account number (e.g., Primary Account Number or PAN), name, expiration date and/or other such data. In several embodiments, the non-standard magstripe payment cards can be thought of as non-personalized payment cards. Embodiments of non-standard magstripe payment cards described herein can however include a user personalization space on a surface of the card. In the user space, the card holder can add logos, initials or other suitable information for distinguishing the card holder's payment card from other such cards. In some embodiments, a card holder can place a portion of his/her account number in the user space on the payment card. However, in a majority of embodiments, this information is not stored on the payment card and the only information stored on the magnetic medium of the payment card is the serial number assigned to the card. In some embodiments, other information not sensitive to the card holder may be stored on the non-standard magstripe payment card. In one embodiment, for example, information such as the card brand or issuer name may also be stored on the surface of or on the magnetic medium of the non-standard magstripe payment card.

FIG. 1 is a schematic block diagram of a system 100 for conducting a financial transaction using a non-standard magstripe payment card 102 in accordance with one embodiment of the present invention. The system 100 includes a card reader 104 for reading the non-standard magstripe payment card 102, a merchant point of sale computer 106 for processing financial transactions, a network 108 and a server 110 for authenticating financial transactions. The card reader 104 is coupled to the merchant point of sale computer 106, which is coupled via network 108 to server 110.

In operation, a card holder of the non-standard magstripe payment card 102 (e.g., magstripe card) can visit the merchant to make a purchase or conduct another financial transaction. To facilitate the transaction, the merchant or card holder can swipe the non-standard magstripe payment card 102 through the card reader 104. The card reader 104 can read a unique serial number assigned to the payment card 102 and card holder. The serial number is stored on the payment card 102 and is typically recorded during card issuance. In addition, the card reader 104 can extract the intrinsic magnetic characteristics of the magnetic medium (e.g., magnetic fingerprint) of the magnetic stripe payment card using techniques described in U.S. Pat. Nos. 6,098,881, 7,478,751, 7,210,627, 7,377,433. 7,703,676, and 7,673,799, the entire content of each document is hereby incorporated by reference. In several embodiments, the intrinsic magnetic characteristics include a unique remnant noise characteristic of the magnetic medium.

The point of sale computer 106 can receive the serial number and magnetic fingerprint information from the reader 104. In one embodiment, either or both of the serial number and magnetic fingerprint information can be encrypted. The point of sale computer 106 can send the magnetic fingerprint, serial number, and details of the requested financial transaction to the server 110 for authentication of the payment card 102. If the payment card is authenticated and the serial number and transaction details validated, the server can generate a dynamic authorization token intended for one time use and send it to the merchant computer. In several embodiments, the dynamic authorization token can be generated using the extracted magnetic fingerprint which is stochastic in nature. In many embodiments, the dynamic authorization token contains no information sensitive or personal to the card holder. In such case, the dynamic authorization token is just a unique one time use value that can be used to settle the current requested transaction.

If the merchant receives the dynamic authorization token, the merchant can allow the requested transaction and send the dynamic authorization token to the server for subsequent payment of authorized settlement funds. If the merchant does not receive the dynamic authorization token, the merchant can prevent completion of the requested financial transaction. In this way and in several embodiments, no traditional card personalization information is sent by the merchant to the server or vice versa. In such case, compliance with PCI requirements can be unnecessary.

FIG. 1 illustrates one system for conducting a financial transaction using a non-standard magstripe payment card. In other embodiments, the non-standard magstripe payment cards can be used with other systems configured to accept traditional payment cards. FIG. 1 also illustrates a single server for authenticating various aspects of a non-standard magstripe payment card financial transaction. In other embodiments, the server can include any number of servers including, for example, gateway processors, acquirers and other servers traditionally present to authorize conventional payment card transactions.

In other embodiments, the point of sale computer is replaced by a personal computer attached to a network such as the internet. In such case, the user of the personal computer (e.g., card holder) may initiate the requested financial transaction at a merchant website that acquires the serial number and magnetic fingerprint from the personal computer (via the attached card reader) and provides that information along with information indicative of the requested transaction to the server for card authentication and transaction authorization.

In some embodiments, the card holder can request from his personal computer and/or the server that one or more pre-authenticated swipes be stored for subsequent use. In such case, the card holder swipes his magstripe card and the personal computer sends the magnetic fingerprint and serial number to the server for pre-authentication. If the serial number and magnetic fingerprint are authenticated, either the personal computer or server stores the pre-authenticated swipe for use at a subsequent time. If the card holder would like multiple pre-authenticated swipes stored, he can repeat this process. In several embodiments, the personal computer can be a laptop, home computer, a cell phone, or another mobile device. Systems and methods for generating and storing pre-authenticated swipes are described in U.S. Provisional Patent Application No. 61/422,633 entitled, "SYSTEMS AND METHODS FOR CONDUCTING CONTACTLESS PAYMENTS USING A MOBILE DEVICE AND A MAGSTRIPE PAYMENT CARD", the entire content of which is hereby incorporated by reference. In transactions involving the pre-authenticated swipes, the card need not be present at the point of sale. In addition, a card reader need not be present at the point of sale. In some cases, the pre-authenticated swipes can be transferred to another person who may receive one or more authorization tokens corresponding to the pre-authenticated swipes. In such case, that person may complete a transaction using one of the authorization tokens.

In several embodiments, the non-standard magstripe card is a multi-functional financial card that can act as a credit, debit and/or pre-paid card. In some embodiments, the non-standard magstripe card can be linked as a gift card, a loyalty card, and/or a rewards card. In embodiments where the card is a debit or pre-paid card, it can be loaded with funds via a checking account, a credit card, or any other financial source commonly used as a form of payment. In several embodiments, the non-standard magstripe card can be used at traditional brick and mortar type point of sale devices, for online internet payments or for mobile payments.

The server can act as a multi-functional system. For example, the server can act as a trusted third party for card authentication and transaction authorization. The server is also a token administrator and can be a provider of settlement authorization and/or funds. The server can be an escrow agent that allows a card holder to pre-load funds or establish a link to a settlement account such as a checking or brokerage type account. In several embodiments, the server can set up funding sources and payment settlement like PayPal® or other similar companies. In several embodiments, the server may be thought of as acting like one or more conventional financial processing entities such as a gateway or processor.

Figure 2A:
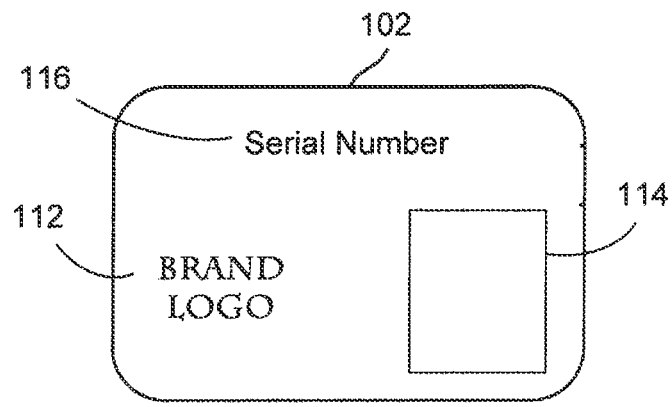
FIG. 2a is a top view of the nonstandard magstripe payment card of FIG. 1 displaying a brand logo and a blank user personalization space in accordance with one embodiment of the present invention.

FIG. 2a is a top view of a non-standard magstripe payment card 104 of FIG. 1 displaying a brand logo 112, a blank user personalization space 114, and a serial number 116 in accordance with one embodiment of the present invention. In other embodiments, the non-standard magstripe payment card 104 does not include the brand logo 112, the user personalization space 114 or the serial number 116. In several embodiments, the serial number 116 printed on the payment card matches the encoded serial number stored on the magnetic medium of the payment card. In other embodiments, the serial number 116 printed on the payment card does not match the encoded serial number stored on the magnetic medium of the payment card. In such case, neither number can be used to perform a transaction without communicating with and obtaining authentication from the server.

Figure 2B:
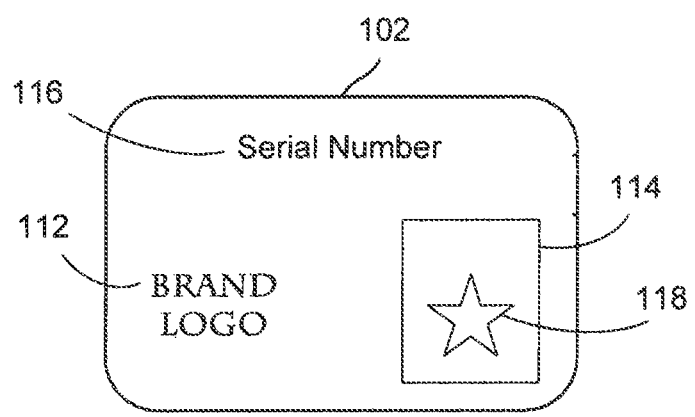
FIG. 2b is a top view of the non-standard magstripe payment card of FIG. 1 where the user personalization space has been personalized in accordance with one embodiment of the present invention.

FIG. 2b is a top view of the non-standard magstripe payment card 104 of FIG. 1 where the user personalization space 114 has been personalized in accordance with one embodiment of the present invention. In the embodiment illustrated in FIG. 2b, the card holder has added a star 118 on the user personalization space 114 of payment card 104. In other embodiments, the card holder can add other logos, numbers, and other suitable information for distinguishing the card holder's payment card from other cards.

Figure 2C:
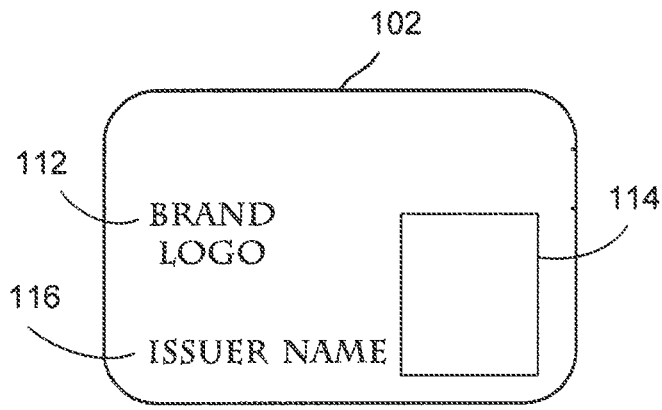
FIG. 2c is a top view of the non-standard magstripe payment card of FIG. 1 displaying a brand logo, an issuer name and a blank user personalization space in accordance with one embodiment of the present invention.

FIG. 2c is a top view of a non-standard magstripe payment card 104 of FIG. 1 displaying a brand logo 112, an issuer name 120 and a blank user personalization space 114 in accordance with one embodiment of the present invention.

Figure 3:
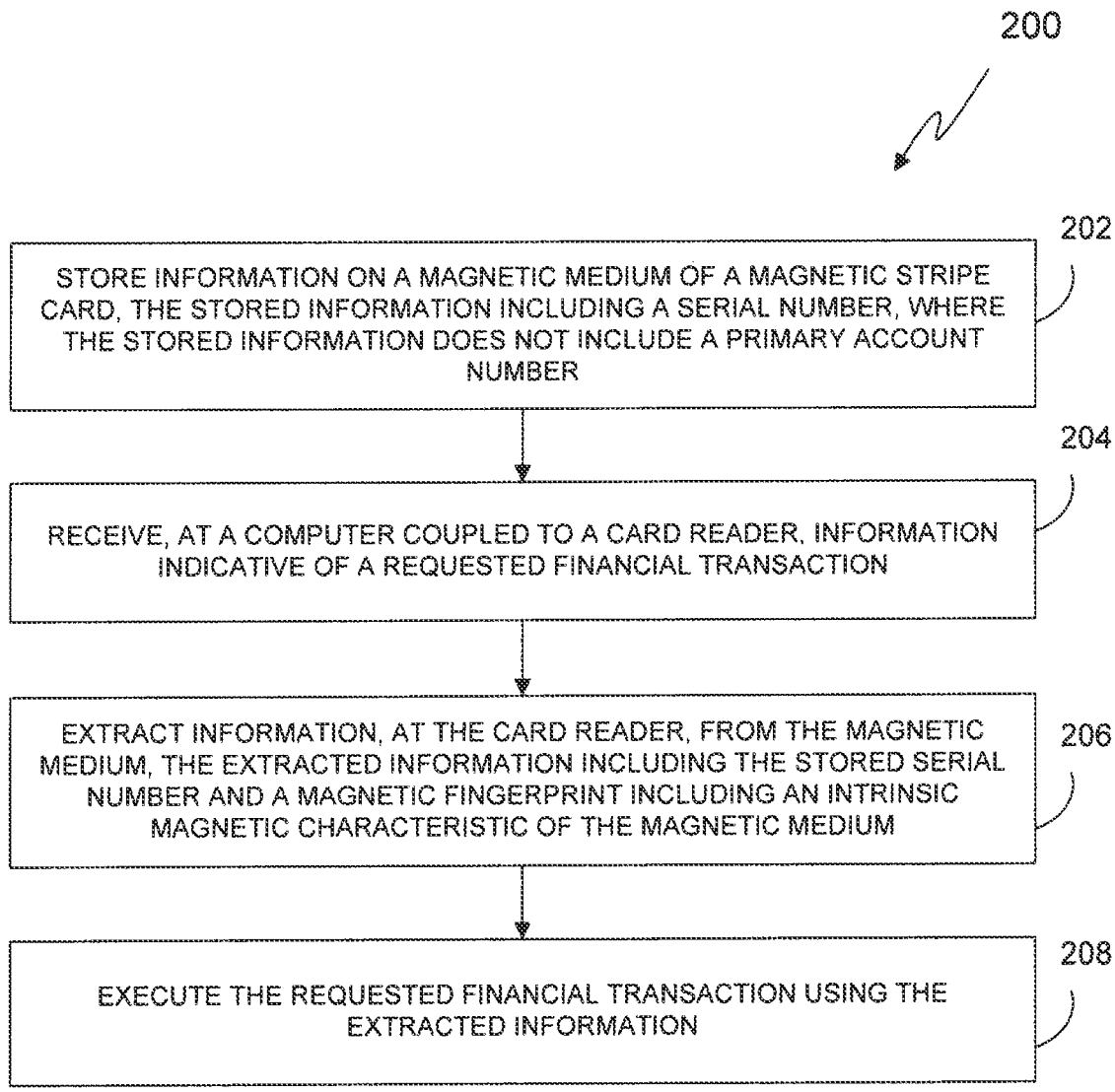
FIG. 3 is a flow chart of a process for conducting a financial transaction using a non-standard magstripe payment card in accordance with one embodiment of the present invention.

FIG. 3 is a flow chart of a process 200 for conducting a financial transaction using a non-standard magstripe payment card in accordance with one embodiment of the present invention. In particular embodiments, the process 200 can be used in conjunction with any of the systems described above in the discussion of FIG. 1. The process first stores (202) information on a magnetic medium of a magnetic stripe card, the stored information comprising a serial number, where the stored information does not include a primary account number. The process receives (204), at a computer coupled to a card reader, information indicative of a requested financial transaction. The process then extracts (206) information, at the card reader, from the magnetic medium, the extracted information including the stored serial number and a magnetic fingerprint including an intrinsic magnetic characteristic of the magnetic medium. The process then executes (208) the requested financial transaction using the extracted information.

In one embodiment, the process can perform the sequence of actions in any order. In another embodiment, the process can skip one or more of the actions. In other embodiments, one of more of the actions are performed simultaneously. In some embodiments, additional actions can be performed.

Figure 4:
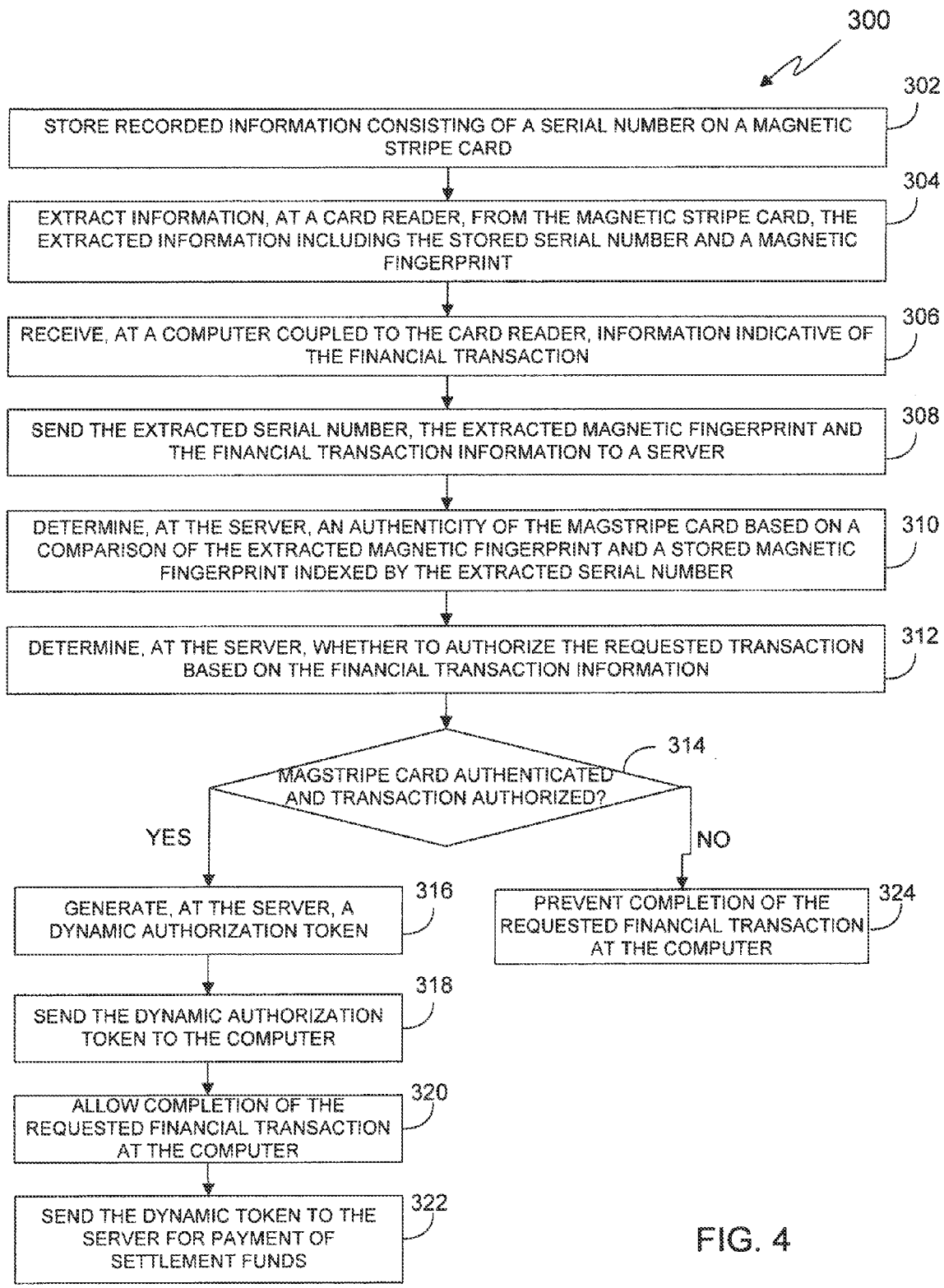
FIG. 4 is a flow chart of a process for conducting a financial transaction using a non-standard magstripe payment card in accordance with another embodiment of the present invention.

FIG. 4 is a flow chart of a process 300 for conducting a financial transaction using a non-standard magstripe payment card in accordance with one embodiment of the present invention. In particular embodiments, the process 300 can be used in conjunction with any of the systems described above in the discussion of FIG. 1. The process first stores (302) recorded information consisting of a serial number on a magnetic stripe card. In several embodiments, the serial number is recorded on the card during issuance. In such case, the process can also extract one or more magnetic fingerprints indicative of the intrinsic magnetic characteristics of the magnetic medium of the payment. The extracted magnetic fingerprints can be stored in a record indexed for example by the assigned serial number. The process can then extract information (304), at a card reader, from the magnetic stripe card, the extracted information including the stored serial number and a magnetic fingerprint. In several embodiments, the process extracts this information using a card reader coupled to a merchant point of sale computer. In some embodiments, the process extracts this information using a card reader coupled to a computer coupled to the internet.

The process then receives (306), at a computer coupled to the card reader, information indicative of the financial transaction. The process sends (308) the extracted serial number, the extracted magnetic fingerprint and the financial transaction information to a server for authentication and/or authorization. The process then determines (310), at the server, an authenticity of the magstripe card based on a comparison of the extracted magnetic fingerprint and a stored magnetic fingerprint indexed by the extracted serial number. In several embodiments, in making the comparison, the server determines whether there is an acceptable degree of correlation between the extracted magnetic fingerprint and the stored magnetic fingerprint. Techniques for determining an acceptable degree of correlation between magnetic fingerprints are described in the patents and patent applications referenced above.

The process then determines (312), at the server, whether to authorize the requested transaction based on the financial transaction information. In several embodiments, in determining whether to authorize the requested transaction, the process considers whether the serial number is valid, whether the amount of the requested transaction is within an authorized limit, and if it is not within the authorized limit whether credit should be extended to the card holder. In other embodiments, the process also takes into account other factors commonly associated with granting credit or authorization of a financial transaction. If the magstripe card is authentic and the requested transaction is authorized, the process generates (316), at the server, a dynamic authorization token and sends (318) the dynamic authorization token to the computer. In several embodiments, the dynamic authorization token is generated using dynamic data from the extracted magnetic fingerprint which is stochastic in nature. In other embodiments, the process can use other sources of dynamic data to generate the dynamic authorization token. In several embodiments, the dynamic authorization token is a one time token that can be used to settle only the currently requested transaction and does not include any sensitive information that can be traced to the card holder. In some embodiments, the dynamic authorization token is derived, generated or randomly assigned. In one embodiment, the dynamic authorization token may take a number of forms, including, without limitation, a form similar to track data traditionally contained on tracks of a magstripe card, a pseudo PAN, an abbreviated PAN, an alpha numeric string, a barcode, or another machine readable form.

If the dynamic token is received at the computer, the process allows (320) completion of the requested financial transaction and sends (322) the dynamic token to the server for payment of settlement funds. In several embodiments, the dynamic token is sent at a later time for batch settlement of authorized transactions. If the magstripe card is not authentic or the requested transaction is not authorized, the authorization token is not send to the computer and the process therefore prevents (324) completion of the requested financial transaction at the computer. In several embodiments, the server notifies the computer as soon as it has determined that the magstripe card is not authentic or that the requested transaction is not authorized. In such case, the computer prevents completion of the requested financial transaction.

In one embodiment, the process can perform the sequence of actions in any order. In another embodiment, the process can skip one or more of the actions. In other embodiments, one of more of the actions are performed simultaneously. In some embodiments, additional actions can be performed.

FIG. 5 is a table illustrating a 16 digit token format for the dynamic authorization token that can be provided to a merchant computer in accordance with one embodiment of the present invention. In several embodiments, the dynamic authorization token can be used with the processes described above for FIG. 3 and FIG. 4. The IIN/BIN is either of a issuer identification number or a bank identification number as are known in the financial payment card industry. The protection code represents dynamic data generated by the server (e,g., from the magnetic fingerprint or via another source) and the check digit is like a checksum value for verifying the integrity of the protection code. In a number of embodiments, the dynamic authorization token takes the form of a conventional payment account number for easy processing by merchants.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In a number of embodiments, all financial transactions using the non-standard magstripe payment cards are initiated by a secure card swipe. In one embodiment, the swipe need not occur at a point of sale and is instead stored for subsequent use. In several embodiments, all transactions can utilize encryption, tokenization and authentication of system components including the card, the card reader and the server. In a number of embodiments, no card holder data or personally identifying information is transmitted from the point of sale to the trusted server. In several embodiments, the serial number stored on the card is effectively useless if copied, read, or otherwise stored.

What is claimed is:

1. A system for conducting a financial transaction using a non-standard payment card having a magnetic stripe, the system comprising:
   a magnetic stripe card storing information comprising a serial number on a magnetic medium of the magnetic stripe card, wherein the stored information does not include a Primary Account Number;
   a card reader configured to extract information from the magnetic medium, the extracted information comprising the stored serial number and a magnetic fingerprint comprising an intrinsic magnetic characteristic of the magnetic medium, wherein the extracted magnetic fingerprint comprises dynamic data that is stochastic; and
   a computer coupled to the card reader and to a server, wherein the computer and the server are configured to execute a requested financial transaction using the extracted information,
   wherein the computer is configured to:
     receive information indicative of the requested financial transaction; and
     send the extracted serial number, the extracted magnetic fingerprint, and the financial transaction information to the server,
   wherein the server is configured to:

determine whether to authorize the requested transaction based on the financial transaction information; and determine an authenticity of the magnetic stripe card based on a comparison of the extracted magnetic fingerprint and a stored magnetic fingerprint indexed by the serial number, wherein, if the magnetic stripe card is determined to be authentic and the requested transaction is authorized, the server is further configured to:

generate a dynamic authorization token using the dynamic data from the extracted magnetic fingerprint; and send the dynamic authorization token to the computer.

2. The system of claim 1, wherein the magnetic stripe card does not include a name of a card holder of the magnetic stripe card.

3. The system of claim 1, wherein the magnetic stripe card comprises an indicia on a surface of the magnetic stripe card, the indicia selected from the group consisting of the serial number, an issuer name, a brand logo, and a user personalization space.

4. The system of claim 1, wherein the intrinsic magnetic characteristic of the magnetic medium comprises a remnant noise characteristic.

5. The system of claim 1, wherein the computer comprises a point of sale computer located at a merchant.

6. The system of claim 1:

wherein, if the dynamic token is received, the computer is further configured to:

allow completion of the requested financial transaction; and send the dynamic token to the server for payment of settlement funds; and wherein, if the dynamic token is not received, the computer is further configured to prevent completion of the requested financial transaction.

7. The system of claim 6, wherein the dynamic authorization token comprises a Payment Account Number.

8. The system of claim 6, wherein the dynamic authorization token is configured for one time use.

9. The system of claim 1:

wherein the serial number is an index for the magnetic fingerprint; and wherein the serial number does not comprise a Primary Account Number.

10. The system of claim 1, wherein the Primary Account Number is defined by the ISO/IEC 7812 standard and comprises:

an Issuer Identification Number (IIN) comprising up to 6 digits;

an Individual Account Identification number comprising up to 12 digits; and a Check Digit comprising 1 digit.

11. The system of claim 1, wherein the magnetic medium does not store a Primary Account Number.

12. The system of claim 1, wherein the magnetic medium never stores a Primary Account Number.

13. A method for conducting a financial transaction with a non- standard payment card having a magnetic stripe, the method comprising:

storing information on a magnetic medium of a magnetic stripe card, the stored information comprising a serial number, wherein the stored information does not include a Primary Account Number;

receiving, at a computer coupled to a card reader, information indicative of a requested financial transaction;

extracting information, at the card reader, from the magnetic medium, the extracted information comprising the stored serial number and a magnetic fingerprint comprising an intrinsic magnetic characteristic of the magnetic medium, wherein the extracted magnetic fingerprint comprises dynamic data that is stochastic; and executing the requested financial transaction using the extracted information, wherein the executing the requested financial transaction using the extracted information comprises:

sending the extracted serial number, the extracted magnetic fingerprint and the financial transaction information to a server;

determining, at the server, an authenticity of the magnetic stripe card based on a comparison of the extracted magnetic fingerprint and a stored magnetic fingerprint indexed by the serial number;

determining, at the server, whether to authorize the requested transaction based on the financial transaction information;

if the magnetic stripe card is authentic and the requested transaction is authorized:

generating, at the server, a dynamic authorization token the dynamic data from the extracted magnetic fingerprint; and sending the dynamic authorization token to the computer.

14. The method of claim 13, wherein the magnetic stripe card does not include a name of a card holder of the magnetic stripe card.

15. The method of claim 13, wherein the magnetic stripe card comprises an indicia on a surface of the magnetic stripe card, the indicia selected from the group consisting of the serial number, an issuer name, a brand logo, and a user personalization space.

16. The method of claim 13, wherein the intrinsic magnetic characteristic of the magnetic medium comprises a remnant noise characteristic.

17. The method of claim 13, wherein the computer comprises a point of sale computer located at a merchant.

18. The method of claim 13, wherein the executing the requested financial transaction using the extracted information further comprises:

if the dynamic token is received at the computer:

allowing completion of the requested financial transaction; and sending the dynamic token to the server for payment of settlement funds; and if the dynamic token is not received at the computer, preventing completion of the requested financial transaction.

19. The method of claim 13, wherein the dynamic authorization token comprises a Payment Account Number.

20. The method of claim 13, wherein the dynamic authorization token is configured for one time use.

21. The method of claim 13:

wherein the serial number is an index for the magnetic fingerprint; and wherein the serial number does not comprise a Primary Account Number.

22. The method of claim 13, wherein the Primary Account Number is defined by the ISO/IEC 7812 standard and comprises:

an Issuer Identification Number (IIN) comprising up to 6 digits;

an Individual Account Identification number comprising up to 12 digits; and a Check Digit comprising 1 digit.

23. The method of claim 13, wherein the magnetic medium does not store a Primary Account Number.

24. The method of claim 13, wherein the magnetic medium never stores a Primary Account Number.

* * * * *